Figure 1:
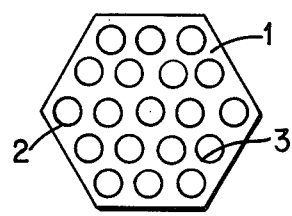

United States Patent [19]

Vachon

[11] 4,192,714

[45] Mar. 11, 1980

[54] REACTOR SAFETY METHOD

[75] Inventor: Lawrence J. Vachon, Clairton, Pa.

[73] Assignee: The United States of America as represented by the United States Department of Energy, Washington, D.C.

[21] Appl. No.: 600,695

[22] Filed: Dec. 7, 1966

[51] Int. Cl.$^2$ .............................................. G21C 7/06
[52] U.S. Cl. ................................... 176/22; 176/86 R; 176/DIG. 5
[58] Field of Search ................ 176/22, 58, 86, DIG. 5

[56] References Cited

U.S. PATENT DOCUMENTS

| 2,735,811 | 2/1956 | Weinberg et al. | 176/22 |
| 2,979,450 | 4/1961 | Dusbabek | 176/22 |
| 2,987,455 | 6/1961 | Huston et al. | 176/22 |
| 3,264,952 | 8/1966 | Winders | 176/36 |

OTHER PUBLICATIONS

NAA-SR-276 (Del.), 1953, pp. 9–11.
KAPL-M-LBV-7, 1957, pp. 28, 29.
Second U.N. Conference, 1958, vol. 11, pp. 187–188.

*Primary Examiner*—Harvey E. Behrend
*Attorney, Agent, or Firm*—R. V. Lupo; William D. Lee; David R. Francescani

[57] ABSTRACT

This invention relates to safety means for preventing a gas cooled nuclear reactor from attaining criticality prior to start up in the event the reactor core is immersed in hydrogenous liquid. This is accomplished by coating the inside surface of the reactor coolant channels with a neutral absorbing material that will vaporize at the reactor's operating temperature.

4 Claims, 2 Drawing Figures

REACTOR SAFETY METHOD

A preferred nuclear reactor in which to employ the present invention is a solid core nuclear reactor for a rocket engine. This type of core is generally under-moderated employing a moderator-fuel mixture such as uranium carbide and carbon. The propellant, preferably hydrogen gas, passes through passages which have been drilled through the solid fuel-moderator matrix. The major portion of the neutron moderation is due to the carbon and relatively little neutron moderation is due to the hydrogen because of its low density. The long neutron slowing down length in carbon and the necessarily small core for a nuclear rocket prevent the neutron flux from achieving a large measure of thermalization. Therefore, the neutron spectrum is predominantly epithermal and any increase in moderation as would be occasioned by the presence of a strong moderator such as water in the propellant passages will slow down the average neutron flux velocity to an energy region of higher uranium fission cross section. This results in a reactivity increase beyond the capability of a practical reactor control system.

The major American missile launching sites are located near the sea so that there is a distinct possibility of total immersion of a nuclear rocket. This is particularly true at Cape Kennedy, Fla. where a sound lies beside the path from the rocket assembly building to the launch pad. Here, there is a possibility of immersion of a reactor both before and after launching. Also, it is foreseeable that the reactor core could become immersed in the booster rocket's liquid propellant which has a high hydrogen content. Thus, a protective system must be provided to insure that the reactor maintains subcriticality if it is immersed in a hydrogeneous medium such as ocean water or booster propellant. One prior art protective system involves the insertion of several thousand boron poison wires into the coolant channels distributed uniformly throughout the reactor core. A remotely actuated device would remove this nuclear poison after a successful launch. However, failure to extract the poison wires from the core would very likely abort a mission so that the poison system must have high reliability. Accordingly, it is a general object of this invention to provide a safety system for a solid core nuclear reactor which has a high degree of reliability.

Another object of this invention is to provide a reactor safety system which does not depend upon the withdrawal of solid masses of neutron absorbers from a reactor core.

A further object of this invention is to provide a reactor safety system which will maintain reactor subcriticality when the reactor is fully immersed in a liquid hydrogeneous medium.

These objects are achieved by coating the coolant channels of the reactor with an appropriate neutron absorber which can be vaporized and exhausted from the reactor as the reactor is brought up to operating power thereby eliminating the need for any additional moving parts that could fail. A thermal neutron absorber which is particularly appropriate is cadmium. Cadmium has a high thermal neutron absorption cross section with a sharp cutoff low in the epithermal range which gives it a large negative reactivity worth for a thermalized neutron spectrum. When the core is dry, cadmium has very little reactivity worth since the predominantly epithermal spectrum of the core is not significantly affected by a pure thermal absorber. When the core is immersed in water, the neutron flux becomes moderated and predominantly thermal thus greatly enhancing the negative reactivity effect of the cadmium.

The thermal neutron cross section of cadmium is 2,450 barns and this cross section increases with energy to a peak at a resonance energy level of 0.18 ev. From there the capture cross section drops off rapidly with energy. The melting point of cadmium is 321° C. (610° F.) which is relatively low for a metal.

Langmuir's equation may be used to determine the sublimation rate of cadmium. The equation is:

$$w = p\sqrt{(M/T)}$$

where w=sublimation rate
P=pressure
M=molecular weight
T=temperature

At a temperature of 300° C. and a pressure of $10^{-6}$ mm of Hg, the sublimation rate for cadmium is $1.5 \times 10^{-4}$ cm/sec. With these conditions a coating of one mil of cadmium can be removed from the propellant channel walls in approximately 17 seconds by the heated propellant gases passing through the coolant channels upon startup of the reactor.

Figure 2:
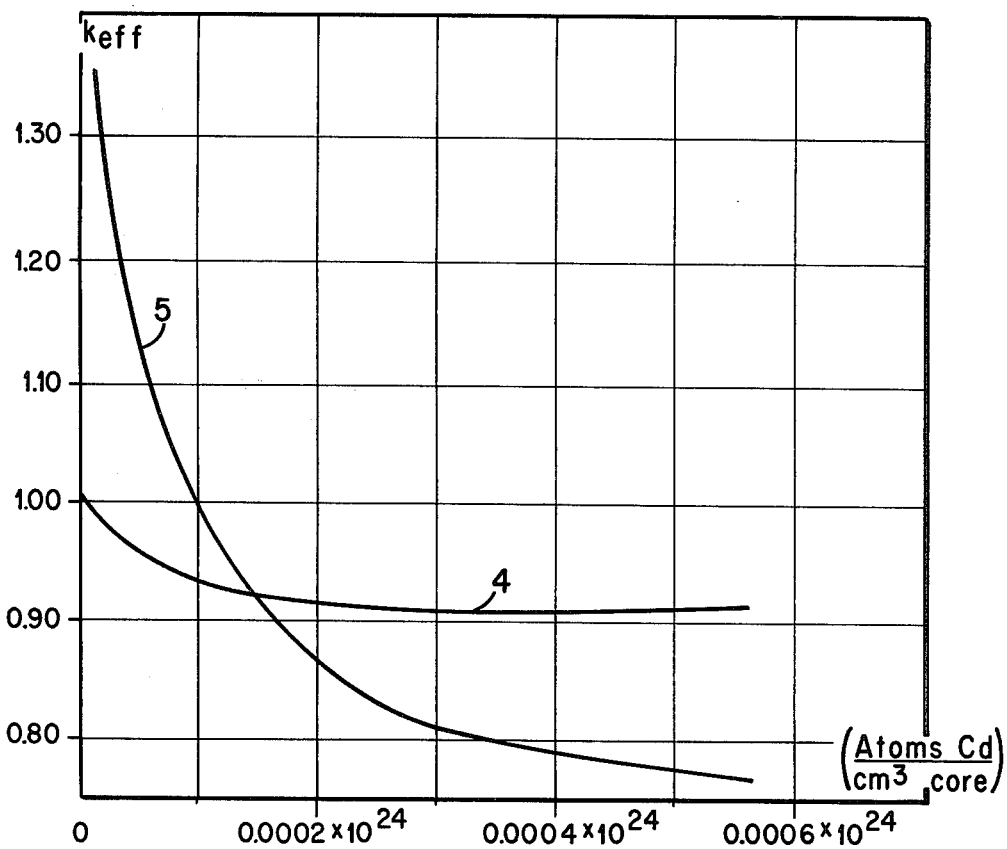

For a better understanding of the invention reference is made to the accompanying drawings in which:

FIG. 1 is a horizontal section view of a preferred rocket reactor fuel element showing the coolant channels, the walls of which are coated with the nuclear poison, cadmium; and FIG. 2 is a graphical representation of the effective multiplication factor as a function of the atoms of cadmium per cubic centimeter in a reactor core composed of fuel elements of the type shown in FIG. 1.

Referring to FIG. 1, a hexagonal fuel element 1 is shown in horizontal section. The preferred fuel element is a carbon matrix having uranium carbide dispersed therein, but other conventional solid moderators and fuels may be employed. Representative moderators include beryllium, beryllia, zirconium hydride, etc. and other solid fuels including conventional fissionable materials such as uranium or plutonium in metallic matrices or in ceramic forms may be used. Coolant channels 2 have been drilled through the fuel element and the propellant gas, preferably hydrogen, passes through the channels thus cooling the fuel element. Cadmium coating 3 lines the coolant channel 2. A cadmium coating of one mil thickness is sufficient for the rocket reactor core of the preferred embodiment which has an excess of reactivity of 4.2 dollars (approximately 0.03 Δk) in the dry, unpoisoned condition. The core primary control may be achieved by a series of rotary drums (not shown) around the periphery of the core located within the reflector region. Cadmium is not put into the region immediately adjacent to the control drums as this would detract from the reactivity worth of the drums. With the coolant channels in the remainder of the core coated with one mil of cadmium, the reactor can achieve a delayed critical state thus enabling it to come up to power and generate heat sufficient to sublime the cadmium. In the dry condition with the control drums fully in an effective multiplication factor ($k_{eff}$) of 0.968 results. With the core immersed in water, a $k_{eff}$ of 0.950 occurs which shows that the cadmium absorber is worth more in the thermal region. However, with this embodiment, in order to have the capability of bringing the reactor critical when dry, the effective multiplication factor of the dry cadmium poisoned core must not be lower than 0.95 in order to remain within the reactivity span of the control drums; i.e., the primary control system must be able to insert enough reactivity to bring the reactor to criticality.

Referring now to FIG. 2, curve 4 represents the effective multiplication factor, $k_{eff}$, as a function of cadmium atoms per cubic centimeter in the core in the dry condition, i.e. for the calculation the cadmium in the coating was uniformly distributed throughout the core. Curve 5 represents the same core immersed in water. The high $k_{eff}$ when the core is immersed without cadmium demonstrates the need for the poison. The fact that curve 5 crosses curve 4 is significant as it shows that the reactivity worth of the cadmium is more effective when the core's neutron spectrum becomes more thermal. The result is that the increased effectiveness of the cadmium can offset the increase in reactivity due to the presence of additional moderator.

Other neutron poisons which sublime or can be readily vaporized could be employed in the present invention. Hafnium, boron, gadolinium, dysprosium, and other well known neutron absorbers can be used, depending on the neutron spectrum of the core. Various compounds which can be formed with the absorbers can be chosen by the reactor designer so that vaporization will occur below the reactor's operating temperature. The scope of the invention is limited only by the following claims.

What is claimed is:

1. In a gas cooled nuclear reactor having a ratio of fissionable material to moderator, wherein the fissionable material is uranium and the moderator is solid graphite having coolant channels and gaseous hydrogen coolant, control drums capable of maintaining the reactor in a subcritical state prior to start-up in the absence of hydrogenous liquid, and safety means for maintaining the reactor in a subcritical state prior to start-up in the event the reactor is immersed in a hydrogenous liquid comprising:

a coating of an essentially thermal neutron absorbing material on the inside surface of the coolant channels in an amount sufficient to prevent the reactor from attaining criticality when immersed in a hydrogenous liquid but not so great as to prevent the reactor from attaining criticality in the absence of hydrogenous liquid, wherein said coating vaporizes at a temperature lower than the operating temperature of the reactor.

2. The gas cooled nuclear reactor of claim 1 wherein the majority of fissions occur in the epithermal energy range.

3. The gas cooled nuclear reactor of claim 1 wherein the safety means is further defined by:

a coating of an essentially thermal neutron absorbing material on the inside surface of the coolant channels, excepting those coolant channels on the core periphery.

4. The gas cooled nuclear reactor of claim 1 wherein the essentially neutron absorbing material is cadmium.

* * * * *